United States Patent
Wang et al.

(10) Patent No.: US 10,025,033 B2
(45) Date of Patent: Jul. 17, 2018

(54) OPTICAL FIBER STRUCTURE, OPTICAL COMMUNICATION APPARATUS AND MANUFACTURING PROCESS FOR MANUFACTURING THE SAME

(71) Applicant: Advanced Semiconductor Engineering, Inc., Kaohsiung (TW)

(72) Inventors: Wei Lun Wang, Kaohsiung (TW); Yi-Min Chin, Kaohsiung (TW); Mei-Ju Lu, Kaohsiung (TW); Jia-Hao Zhang, Kaohsiung (TW)

(73) Assignee: ADVANCED SEMICONDUCTOR ENGINEERING, INC., Kaohsiung (TW)

(*) Notice: Subject to any disclaimer, the term of this patent is extended or adjusted under 35 U.S.C. 154(b) by 0 days.

(21) Appl. No.: 15/057,936

(22) Filed: Mar. 1, 2016

(65) Prior Publication Data

US 2017/0254956 A1 Sep. 7, 2017

(51) Int. Cl.
- *G02B 6/26* (2006.01)
- *G02B 6/34* (2006.01)
- *G02B 6/42* (2006.01)

(52) U.S. Cl.
CPC ............. *G02B 6/262* (2013.01); *G02B 6/34* (2013.01); *G02B 6/4206* (2013.01); *G02B 6/4208* (2013.01); *G02B 6/4214* (2013.01)

(58) Field of Classification Search
USPC .......................................................... 385/16
See application file for complete search history.

(56) References Cited

U.S. PATENT DOCUMENTS

| | | | |
|---|---|---|---|
| 4,351,585 A * | 9/1982 | Winzer | G02B 6/2817 250/227.24 |
| 5,598,495 A | 1/1997 | Rittle et al. | |
| 5,684,905 A * | 11/1997 | Sugawara | A61B 5/1172 362/554 |
| 6,088,153 A | 7/2000 | Anthon et al. | |
| 6,229,158 B1 | 5/2001 | Minemier et al. | |
| 6,229,712 B1 | 5/2001 | Munoz-Bustamante et al. | |
| 6,253,005 B1 | 6/2001 | Bergmann et al. | |
| 6,275,625 B1 | 8/2001 | Bergmann | |
| 6,325,552 B1 | 12/2001 | Brillhart | |
| 6,351,329 B1 | 2/2002 | Greywall | |
| 6,363,203 B1 | 3/2002 | Dautartas | |
| 6,370,311 B1 | 4/2002 | Basavanhally | |
| 6,374,012 B1 | 4/2002 | Bergmann et al. | |
| 6,388,798 B2 | 5/2002 | Smith et al. | |
| 6,396,711 B1 | 5/2002 | Degani et al. | |
| 6,399,418 B1 | 6/2002 | Glenn et al. | |
| 6,404,533 B1 | 6/2002 | Fergusson | |

(Continued)

*Primary Examiner* — Kaveh C Kianni
(74) *Attorney, Agent, or Firm* — Foley & Lardner LLP; Cliff Z. Liu

(57) ABSTRACT

The present disclosure relates to an optical fiber structure, an optical communication apparatus and a manufacturing process for manufacturing the same. The optical fiber structure includes a core portion and a cladding portion. The cladding portion encloses the core portion, and includes a light reflection surface and a light incident surface. The light reflection surface is inclined at an angle of about 30 degrees to about 60 degrees with respect to the core portion, and the light incident surface is substantially flat and is substantially parallel with the core portion.

18 Claims, 10 Drawing Sheets

(56) References Cited

U.S. PATENT DOCUMENTS

| | | |
|---|---|---|
| 6,408,120 B1 | 6/2002 | Dautartas |
| 6,411,757 B1 | 6/2002 | Brener et al. |
| 6,420,204 B2 | 7/2002 | Glenn |
| 6,431,765 B1 | 8/2002 | Chen et al. |
| 6,439,895 B1 | 8/2002 | Li |
| 6,442,306 B1 | 8/2002 | Dautartas et al. |
| 6,442,307 B1 | 8/2002 | Carr et al. |
| 6,448,506 B1 | 9/2002 | Glenn et al. |
| 6,477,301 B1 | 11/2002 | Anthon et al. |
| 6,487,001 B2 | 11/2002 | Greywall |
| 6,487,356 B1 | 11/2002 | Harrison et al. |
| 6,512,861 B2 | 1/2003 | Chakravorty et al. |
| 6,519,075 B2 | 2/2003 | Carr et al. |
| 6,628,452 B2 | 3/2003 | Haeberle et al. |
| 6,560,377 B2 | 5/2003 | Jones et al. |
| 6,564,454 B1 | 5/2003 | Glenn et al. |
| 6,576,998 B1 | 6/2003 | Hoffman |
| 6,586,824 B1 | 7/2003 | Glenn et al. |
| 6,603,183 B1 | 8/2003 | Hoffman |
| 6,618,184 B2 | 9/2003 | Jin et al. |
| 6,624,444 B1 | 9/2003 | Li |
| 6,630,661 B1 | 10/2003 | Hoffman |
| 6,639,724 B2 | 10/2003 | Bower et al. |
| 6,646,290 B1 | 11/2003 | Lee et al. |
| 6,661,943 B2 | 12/2003 | Li |
| 6,686,588 B1 | 2/2004 | Webster et al. |
| 6,702,476 B2 | 3/2004 | Bergmann et al. |
| 6,704,475 B2 | 3/2004 | Jin et al. |
| 6,704,476 B2 | 3/2004 | Ford et al. |
| 6,712,527 B1 | 3/2004 | Chan et al. |
| 6,716,657 B1 | 4/2004 | Soh |
| 6,718,086 B1 | 4/2004 | Ford et al. |
| 6,740,950 B2 | 5/2004 | Paek |
| 6,748,125 B2 | 6/2004 | Deliwala |
| 6,754,407 B2 | 6/2004 | Chakravorty et al. |
| 6,757,458 B2 | 6/2004 | Neilson et al. |
| 6,759,266 B1 | 7/2004 | Hoffman |
| 6,765,801 B1 | 7/2004 | Glenn et al. |
| 6,771,850 B1 | 8/2004 | Greywall |
| 6,784,534 B1 | 8/2004 | Glenn et al. |
| 6,788,847 B2 | 9/2004 | Paddon et al. |
| 6,792,178 B1 | 9/2004 | Zhou |
| 6,793,407 B2 | 9/2004 | Jacobowitz et al. |
| 6,801,676 B1 | 10/2004 | Liu |
| 6,807,218 B1 | 10/2004 | Greenwood et al. |
| 6,809,258 B1 | 10/2004 | Dang et al. |
| 6,809,848 B2 | 10/2004 | Carr et al. |
| 6,813,054 B2 | 11/2004 | Aksyuk et al. |
| 6,819,813 B2 | 11/2004 | Howland et al. |
| 6,836,185 B1 | 12/2004 | Pobanz |
| 6,839,517 B2 | 1/2005 | Anigbo et al. |
| 6,841,842 B2 | 1/2005 | Li |
| 6,846,087 B2 | 1/2005 | Carr et al. |
| 6,856,730 B2 | 2/2005 | Johnson et al. |
| 6,859,324 B2 | 2/2005 | Meyers et al. |
| 6,861,720 B1 | 3/2005 | Heckman et al. |
| 6,869,815 B2 | 3/2005 | Gasparyan et al. |
| 6,879,751 B2 | 4/2005 | Deliwala |
| 6,864,553 B2 | 5/2005 | Bennett et al. |
| 6,891,685 B2 | 5/2005 | Deliwala et al. |
| 6,896,422 B2 | 5/2005 | Bennett et al. |
| 6,906,846 B2 | 6/2005 | Cirelli et al. |
| 6,912,330 B2 | 6/2005 | Deliwala |
| 6,922,499 B2 | 7/2005 | Boie et al. |
| 6,944,008 B2 | 9/2005 | Arney et al. |
| 6,944,369 B2 | 9/2005 | Deliwala |
| 6,955,481 B2 | 10/2005 | Colgan et al. |
| 6,968,110 B2 | 11/2005 | Patel et al. |
| 6,973,230 B1 | 12/2005 | MacKay |
| 6,975,664 B1 | 12/2005 | Dodabalapur et al. |
| 6,975,784 B1 | 12/2005 | Xu et al. |
| 7,000,434 B2 | 2/2006 | Murali |
| 7,003,196 B2 | 2/2006 | Ghiron et al. |
| 7,013,067 B2 | 3/2006 | Ghiron et al. |
| 7,015,056 B2 | 3/2006 | Gasparyan et al. |
| 7,020,364 B2 | 3/2006 | Ghiron et al. |
| 7,026,707 B2 | 4/2006 | Li et al. |
| 7,031,562 B2 | 4/2006 | Paddon et al. |
| 7,039,263 B2 | 5/2006 | Towle |
| 7,042,106 B2 | 5/2006 | Lu et al. |
| 7,049,704 B2 | 5/2006 | Chakravorty et al. |
| 7,054,534 B1 | 5/2006 | Gunn, III et al. |
| 7,058,247 B2 | 6/2006 | Crow et al. |
| 7,059,040 B1 | 6/2006 | Webster et al. |
| 7,068,892 B1 | 6/2006 | Lu et al. |
| 7,081,981 B2 | 7/2006 | Ling et al. |
| 7,082,246 B1 | 7/2006 | Gunn, III et al. |
| 7,095,620 B2 | 8/2006 | Bozso et al. |
| 7,095,914 B2 | 8/2006 | Xu et al. |
| 7,116,881 B1 | 10/2006 | Gunn, III et al. |
| 7,123,798 B2 * | 10/2006 | Fukuyama ........... G02B 6/3636 385/47 |
| 7,125,176 B1 * | 10/2006 | Stafford ............... G02B 6/4214 385/49 |
| 7,146,106 B2 | 12/2006 | Yang et al. |
| 7,159,421 B2 | 1/2007 | Bhandarkar et al. |
| 7,162,124 B1 * | 1/2007 | Gunn, III ................. G02B 6/30 385/27 |
| 7,177,499 B2 | 2/2007 | Johnson |
| 7,187,837 B2 | 3/2007 | Gothoskar et al. |
| 7,194,166 B1 | 3/2007 | Gunn, III |
| 7,212,713 B2 | 5/2007 | Fukuzawa et al. |
| 7,224,076 B2 | 5/2007 | Agrawal et al. |
| 7,229,221 B2 | 6/2007 | Ahrens |
| 7,245,803 B2 | 7/2007 | Gunn, III et al. |
| 7,256,059 B2 | 8/2007 | Lu et al. |
| 7,260,289 B1 | 8/2007 | Gunn, III et al. |
| 7,260,293 B1 | 8/2007 | Gunn, III et al. |
| 7,269,326 B2 | 9/2007 | Paddon et al. |
| 7,283,699 B2 | 10/2007 | Lu et al. |
| 7,298,939 B1 | 11/2007 | Malendevich et al. |
| 7,333,695 B2 | 2/2008 | Xu et al. |
| 7,334,946 B2 | 2/2008 | Lu |
| 7,343,058 B2 | 3/2008 | Block et al. |
| 7,352,066 B2 | 4/2008 | Budd et al. |
| 7,359,591 B2 | 4/2008 | Vandentop et al. |
| 7,359,609 B2 | 4/2008 | Mahoney et al. |
| 7,367,715 B1 | 5/2008 | Budd et al. |
| 7,369,718 B2 | 5/2008 | Towel |
| 7,373,033 B2 | 5/2008 | Lu et al. |
| 7,373,044 B2 | 5/2008 | Sekiya et al. |
| 7,409,327 B2 | 8/2008 | Deliwala |
| 7,412,138 B1 | 8/2008 | Malendevich et al. |
| 7,415,184 B2 | 8/2008 | Ghiron et al. |
| 7,433,193 B2 | 10/2008 | Yee et al. |
| 7,453,132 B1 | 11/2008 | Gunn, III et al. |
| 7,470,069 B1 | 12/2008 | Offrein et al. |
| 7,477,811 B1 | 1/2009 | Dellmann et al. |
| 7,480,426 B1 | 1/2009 | Dellmann et al. |
| 7,486,847 B1 | 2/2009 | Dellmann et al. |
| 7,539,366 B1 | 5/2009 | Baks et al. |
| 7,539,376 B2 | 5/2009 | Bozso et al. |
| 7,551,453 B2 | 6/2009 | Bozso et al. |
| 7,556,440 B2 | 7/2009 | Birincioglu et al. |
| 7,576,401 B1 | 8/2009 | De Guzman et al. |
| 7,609,461 B1 | 10/2009 | Webster et al. |
| 7,616,904 B1 | 11/2009 | Gunn, III et al. |
| 7,630,601 B2 | 12/2009 | Mershon et al. |
| 7,676,132 B1 | 3/2010 | Mandry et al. |
| 7,684,660 B2 | 3/2010 | Braunisch et al. |
| 7,701,985 B2 | 4/2010 | Webster et al. |
| 7,731,432 B2 | 6/2010 | Theodoras, II |
| 7,773,836 B2 | 8/2010 | De Dobbelaere |
| 7,801,397 B2 | 9/2010 | Block et al. |
| 7,826,692 B2 | 11/2010 | Mongold |
| 7,826,694 B2 | 11/2010 | Vandentop et al. |
| 7,853,105 B2 | 12/2010 | Budd et al. |
| 7,903,911 B2 | 3/2011 | Sekiya et al. |
| 7,911,017 B1 | 3/2011 | De Guzman et al. |
| 7,936,033 B2 | 5/2011 | Haskett et al. |
| 7,941,023 B2 | 5/2011 | Patel et al. |
| 7,945,127 B2 | 5/2011 | Lu |
| 7,961,992 B2 | 6/2011 | De Dobbelaere et al. |
| 8,057,108 B2 | 11/2011 | Bhowmik et al. |

(56) References Cited

U.S. PATENT DOCUMENTS

| | | |
|---|---|---|
| 8,165,431 B2 | 4/2012 | De Dobbelaere et al. |
| 8,200,056 B2 | 6/2012 | Baugh |
| 8,231,284 B2 | 7/2012 | Doany et al. |
| 8,265,432 B2 | 9/2012 | Doany et al. |
| 8,280,207 B2 | 10/2012 | Pinguet et al. |
| 8,373,259 B2 | 2/2013 | Kim et al. |
| 8,445,984 B2 | 5/2013 | Haskett et al. |
| 8,488,921 B2 | 7/2013 | Doany et al. |
| 8,545,108 B1 | 10/2013 | Barwicz et al. |
| 8,577,191 B2 | 11/2013 | De Dobbelaere et al. |
| 8,588,561 B2 | 11/2013 | Zbinden et al. |
| 8,613,561 B2 | 12/2013 | Ko et al. |
| 8,626,002 B2 | 1/2014 | Kucharski |
| 8,694,721 B2 | 4/2014 | Haywood |
| 8,724,937 B2 | 5/2014 | Barwicz et al. |
| 8,731,346 B2 | 5/2014 | Tseng et al. |
| 8,750,657 B2 | 6/2014 | Levy et al. |
| 8,755,644 B2 | 6/2014 | Budd et al. |
| 8,787,711 B2 | 7/2014 | Zbinden et al. |
| 8,831,437 B2 | 9/2014 | Dobbelaere et al. |
| RE45,214 E | 10/2014 | De Dobbelaere et al. |
| RE45,215 E | 10/2014 | De Dobbelaere et al. |
| 8,861,906 B2 | 10/2014 | Pinguet et al. |
| 8,871,570 B2 | 10/2014 | Levy et al. |
| 8,873,899 B2 | 10/2014 | Anderson et al. |
| 8,873,912 B2 | 10/2014 | Dangel et al. |
| 8,876,410 B2 | 11/2014 | Shastri et al. |
| 8,905,632 B2 | 12/2014 | Shastri et al. |
| 8,913,856 B2 | 12/2014 | Jacobowitz et al. |
| 8,923,664 B2 | 12/2014 | Mekis et al. |
| 8,926,196 B2 | 1/2015 | Detofsky et al. |
| RE45,390 E | 2/2015 | De Dobbelaere et al. |
| 8,944,704 B2 | 2/2015 | Lagziel et al. |
| 8,983,291 B1 | 3/2015 | Broekaert et al. |
| 8,990,488 B2 | 3/2015 | Haywood |
| 2002/0114260 A1* | 8/2002 | Kasama ................ B82Y 10/00 369/112.27 |
| 2004/0114859 A1* | 6/2004 | Colgan ................ G02B 6/3636 385/31 |
| 2004/0156590 A1 | 8/2004 | Gunn et al. |
| 2005/0117833 A1* | 6/2005 | Fukuzawa ............. G02B 6/125 385/14 |
| 2006/0127003 A1* | 6/2006 | Park ...................... G02B 6/241 385/31 |
| 2006/0140553 A1 | 6/2006 | Theodoras et al. |
| 2009/0214156 A1* | 8/2009 | Okubo ................ G02B 6/4214 385/14 |
| 2010/0008675 A1 | 1/2010 | De Dobbelaere |
| 2010/0129038 A1* | 5/2010 | Mukoyama .......... G02B 6/4206 385/123 |
| 2011/0127633 A1 | 6/2011 | Nadeau et al. |
| 2011/0216997 A1 | 9/2011 | Gothoskar et al. |
| 2011/0317958 A1 | 12/2011 | Nadeau et al. |
| 2012/2890344 | 11/2012 | Shastri et al. |
| 2013/0022316 A1* | 1/2013 | Pelletier ................. G02B 6/30 385/37 |
| 2013/0202255 A1 | 8/2013 | Togami et al. |
| 2013/0243368 A1 | 9/2013 | Levy et al. |
| 2013/0315528 A1 | 11/2013 | Levy |
| 2014/0169789 A1 | 6/2014 | Bhoja |
| 2014/0269804 A1 | 9/2014 | Lai et al. |
| 2014/0284463 A1 | 9/2014 | Kuroda et al. |
| 2014/0286646 A1 | 9/2014 | Zbinden et al. |
| 2014/0306131 A1 | 10/2014 | Mack et al. |
| 2014/0369651 A1 | 12/2014 | Ben David et al. |
| 2014/0369693 A1 | 12/2014 | Peterson et al. |
| 2015/0010268 A1 | 1/2015 | Badihi et al. |
| 2015/0016784 A1 | 1/2015 | Shastri et al. |
| 2015/0021291 A1 | 1/2015 | Shastri et al. |
| 2015/0023452 A1 | 1/2015 | Riani et al. |
| 2015/0037029 A1 | 2/2015 | Waldman et al. |
| 2015/0110501 A1 | 4/2015 | Pobanz |

\* cited by examiner

OPTICAL FIBER STRUCTURE, OPTICAL COMMUNICATION APPARATUS AND MANUFACTURING PROCESS FOR MANUFACTURING THE SAME

BACKGROUND

1. Field of the Disclosure

The present disclosure relates to an optical fiber structure, an optical communication apparatus and manufacturing process for manufacturing the same, and more particularly to a semi-D-shaped optical fiber structure, an optical communication apparatus including the same and manufacturing process for manufacturing the same.

2. Description of the Related Art

In a conventional optical communication apparatus, an optical fiber and a rotatable micromirror may be disposed on a substrate, and a light source may be disposed above the rotatable micromirror. The light beam from the light source is reflected by the rotatable micromirror and then enters a flat end of the optical fiber. However, manufacturing cost of the rotatable micromirror is high, and control of the rotatable micromirror is difficult. To address such concerns, the light source may be disposed at a periphery of the optical fiber to face a side surface of the optical fiber. However, since the side surface of the optical fiber is curved, a portion of the light beam from the light source will enter the optical fiber directly, whereas another portion of the light beam from the light source will be scattered randomly to the air. Thus, a coupling efficiency of the light source to the optical fiber is low; for example about 60%. An improved optical fiber structure is thus desirable.

SUMMARY

The present disclosure relates to an optical fiber structure, an optical communication apparatus and a manufacturing process for manufacturing the same.

In an aspect, the optical fiber structure includes a core portion and a cladding portion. The cladding portion encloses the core portion, and includes a light reflection surface and a light incident surface. The light reflection surface is inclined at an angle of about 30 degrees to about 60 degrees with respect to the core portion, and the light incident surface is substantially flat and is substantially parallel with the core portion.

In an aspect, the optical communication apparatus includes an optical fiber structure and a light source. The optical fiber structure includes a core portion and a cladding portion enclosing the core portion. The cladding portion includes a light reflection surface and a substantially flat light incident surface. The light reflection surface is inclined at an angle of about 30 degrees to about 60 degrees with respect to the core portion. The light source is positioned below the light incident surface and is configured to emit a light beam into the optical fiber structure through the light incident surface to the core portion of the optical fiber structure.

In an aspect, the manufacturing process includes (a) providing a fiber having a core portion and a cladding portion, wherein the cladding portion encloses the core portion; (b) removing a portion of an end portion of the fiber to form a light reflection surface, wherein the light reflection surface is inclined at an angle of about 30 degrees to about 60 degrees with respect to the core portion; and (c) removing a portion of a periphery portion of the fiber to form a light incident surface, wherein the light incident surface is substantially flat and is substantially parallel with the core portion.

DETAILED DESCRIPTION

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

Figure 1:
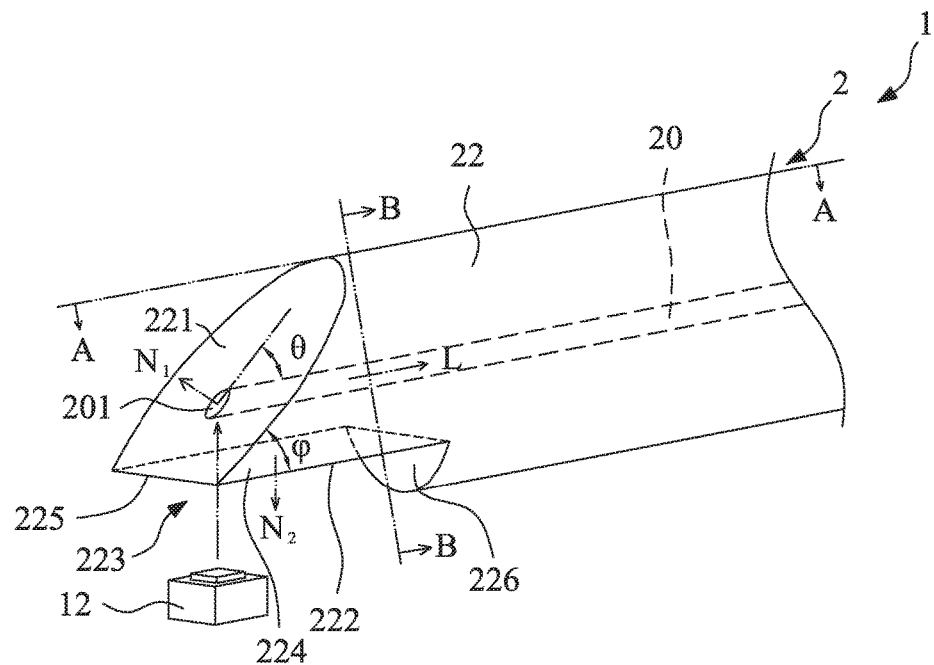
FIG. 1 illustrates a perspective view of an optical communication apparatus according to an embodiment of the present disclosure.
Figure 2:
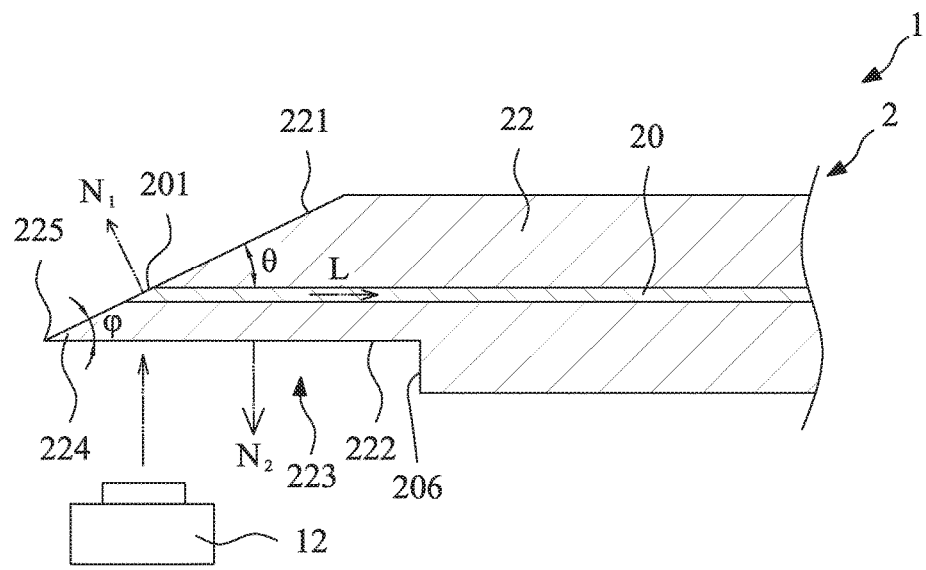
FIG. 2 illustrates a cross sectional view taken along line A-A of FIG. 1.

FIG. 1 illustrates a perspective view of an optical communication apparatus 1 according to an embodiment of the present disclosure. FIG. 2 illustrates a cross sectional view taken along line A-A of FIG. 1. The optical communication apparatus 1 includes an optical fiber structure 2 and a light source 12. The optical fiber structure 2 includes a core portion 20 with a refractive index and a cladding portion 22 with a refractive index. The cladding portion 22 encloses/surrounds the core portion 20. The refractive index of the cladding portion 22 is lower than the refractive index of the core portion 20. The core portion 20 and the cladding portion 22 include in part a same or similar material, such as silica (for example, silicon dioxide, ($SiO_2$)).

The cladding portion 22 has a light reflection surface 221 for reflecting a light beam emitted from the light source 12, and a light incident surface 222 for receiving the light beam emitted from the light source 12. The light reflection surface 221 is inclined at an angle θ with respect to the core portion 20. For example, the angle θ is about 30 degrees to about 60 degrees, such as about 35 degrees to about 55 degrees, about 40 degrees to about 50 degrees, or about 45 degrees. An end 201 of the core portion 20 is exposed from the light reflection surface 221. The light incident surface 222 is flat and substantially parallel with the core portion 20 where the light incident surface 222 is adjacent to the core portion 20. Thus, the light incident surface 222 is not parallel with the light reflection surface 221. As shown in FIG. 1 and FIG. 2, the cladding portion 22 includes a notch 223 on a bottom portion thereof, and the light incident surface 222 is a top surface of the notch 223. That is, the notch 223 is defined by the light incident surface 222 and a side surface 226 of the cladding portion 22.

The light reflection surface 221 and the light incident surface 222 intersect to form a wedge portion 224 and an intersecting edge 225. An angle φ of the wedge portion 224 between the light reflection surface 221 and the light incident surface 222 is about 30 degrees to about 60 degrees, such as about 35 degrees to about 55 degrees, about 40 degrees to about 50 degrees, or about 45 degrees. A line along which the intersecting edge 225 lays (into the page in the orientation shown in FIG. 2) is substantially perpendicular to a line along which the core portion 20 lays (left/right across the page in the orientation shown in FIG. 2). Further, as shown in FIG. 1 and FIG. 2, a normal vector $N_1$ of the light reflection surface 221, a normal vector $N_2$ of the light incident surface 222 and an extending direction L of the core portion 20 are on approximately a same plane (e.g., along a surface of the sheet on which the cross-section in FIG. 2 is illustrated).

The light source 12 is used for emitting the light beam into the optical fiber structure 2 through the light incident surface 222. In one or more embodiments, the light source 12 may be a vertical cavity surface emitting laser (VCSEL) light source or an edge-emitting laser light source. The light source 12 is disposed under the light incident surface 222. Because the light incident surface 222 is a flat surface, most of the light beam emitted from the light source 12 enters the optical fiber structure 2, with a small portion of the light beam emitted from the light source 12 being reflected by the light incident surface 222. Thus, a coupling efficiency of the light source 12 to the optical fiber structure 2 can be high; for example, a coupling efficiency of greater than about 80%. In addition, the optical communication apparatus 1 may omit a rotatable micromirror, which may reduce the manufacturing cost.

Figure 3:
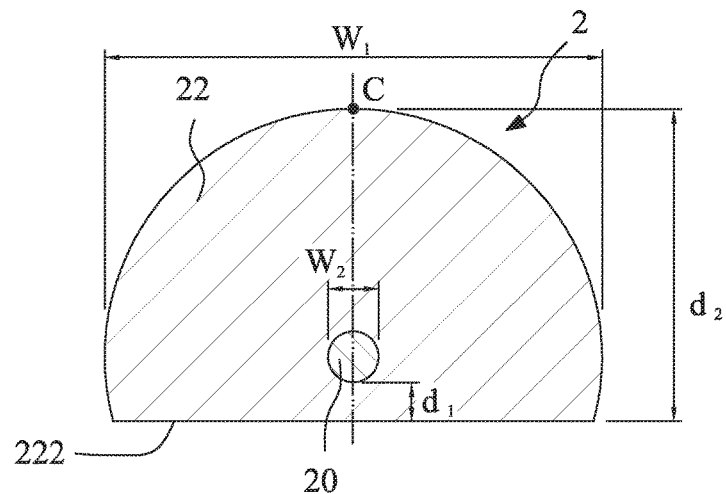
FIG. 3 illustrates a cross sectional view taken along line B-B of FIG. 1.

FIG. 3 illustrates a cross sectional view taken along line B-B of FIG. 1. The optical fiber structure 2 is a single mode fiber. An outer diameter $W_1$ of the cladding portion 22 is about 125 micrometers (μm), and an outer diameter $W_2$ of the core portion 20 is about 8 μm. A minimum distance $d_1$ between the core portion 20 and the light incident surface 222 is less than about 18.5 μm and greater than about 0.8 μm. Therefore, a distance $d_2$ between the light incident surface 222 and a point C on a perimeter of the cladding portion 22 at a point opposite the light incident surface is less than about 85 μm and greater than about 67.3 μm.

Figure 4:
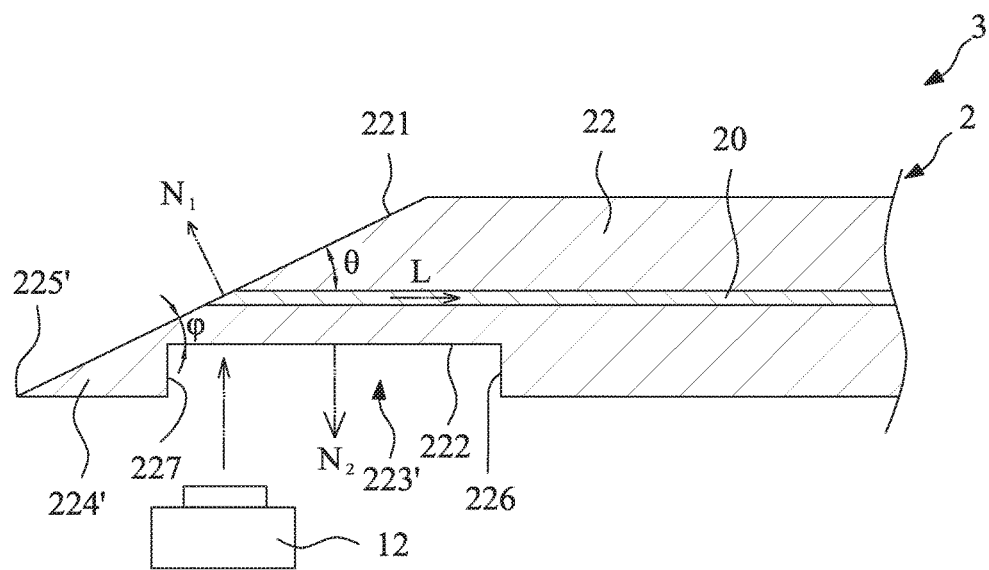
FIG. 4 illustrates a cross sectional view of an optical communication apparatus according to an embodiment of the present disclosure.

FIG. 4 illustrates a cross sectional view of an optical communication apparatus 3 according to an embodiment of the present disclosure. The optical communication apparatus 3 is similar to the optical communication apparatus 1 as shown in FIGS. 1 and 2, with a difference being that the light reflection surface 221 does not intersect with the light incident surface 222 in FIG. 4. A notch 223' is defined by the light incident surface 222 and two opposite side surfaces 226, 227, and a wedge portion 224' extends past (to the left in the orientation shown in FIG. 4) of the side surface 227 of the notch 223'. The light reflection surface 221 and the bottom surface of the wedge portion 224' intersect to form an intersecting edge 225'. The light source 12 is positioned such that the light beam emitted from the light source 12 is directed between the side surfaces 226, 227 and onto the light incident surface 222. The angle φ between the light reflection surface 221 and the light incident surface 222 is as described with respect to FIGS. 1 and 2.

Figure 5:
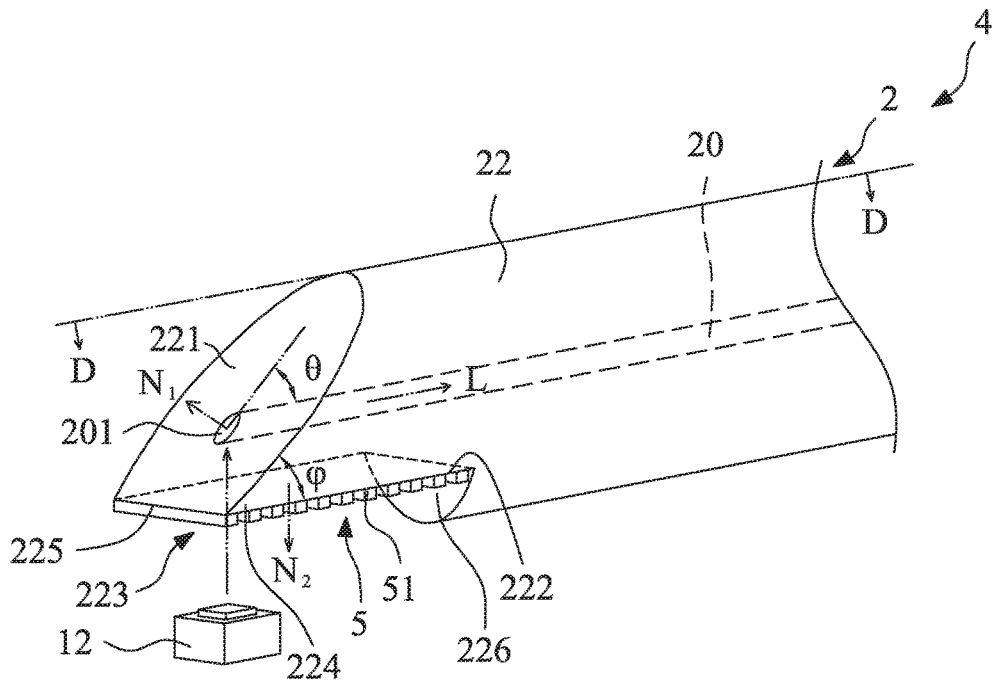
FIG. 5 illustrates a perspective view of an optical communication apparatus according to an embodiment of the present disclosure.
Figure 6:
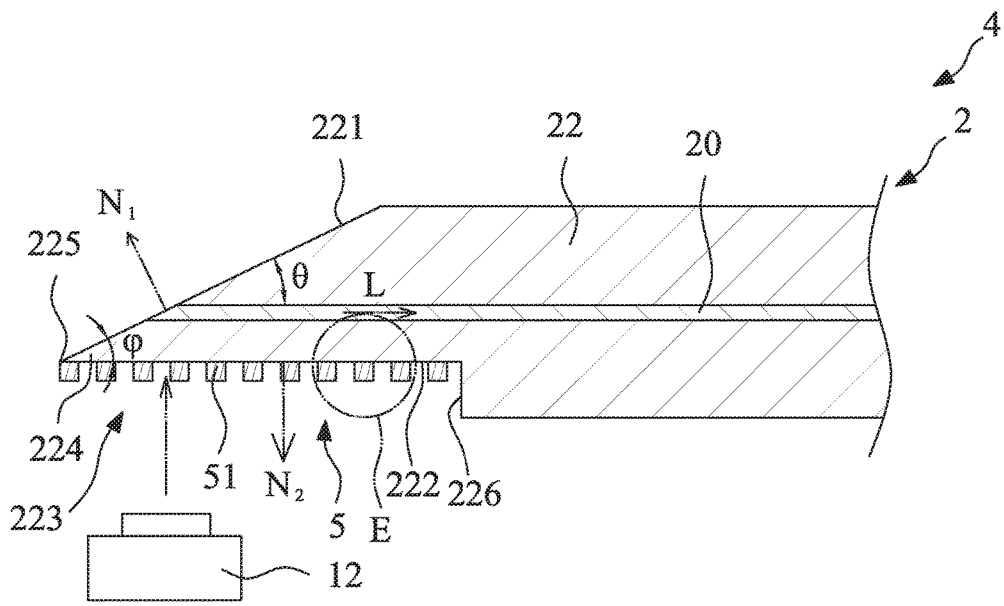
FIG. 6 illustrates a cross sectional view taken along line D-D of FIG. 5.

FIG. 5 illustrates a perspective view of an optical communication apparatus 4 according to an embodiment of the present disclosure. FIG. 6 illustrates a cross sectional view taken along line D-D of FIG. 5. The optical communication apparatus 4 is similar to the optical communication apparatus 1 as shown in FIGS. 1 and 2, with a difference being that the optical communication apparatus 4 further includes a grating structure 5 on the light incident surface 222. The grating structure 5 includes periodic protrusions 51. In one or more embodiments, the protrusions 51 are formed on the light incident surface 222 by coating, and the protrusions 51 may include a different material than does the cladding portion 22. For example, in one or more embodiments, the protrusions 51 include titanium dioxide ($TiO_2$) and the cladding portion 22 includes $SiO_2$. In one or more embodiments, the protrusions 51 of the grating structure 5 are formed by etching (e.g., by chemical etching or laser etching) of the light incident surface 222; in such embodiments, the material of the protrusions 51 is the same as the material of the cladding portion 22. The protrusions 51 and the cladding portion 22 have the same or similar refractive indices, for constructive interference of the light beam emitted from the light source 12 and passed through the grating structure 5. In the embodiment of FIGS. 5 and 6, each of the protrusions 51 is a square column extending from one side of the light incident surface 222 to the other side of the light incident surface 222, and is substantially parallel with the intersecting edge 225. The grating structure 5 can further increase the coupling efficiency of the light source 12 to the optical fiber structure 2.

Figure 7:
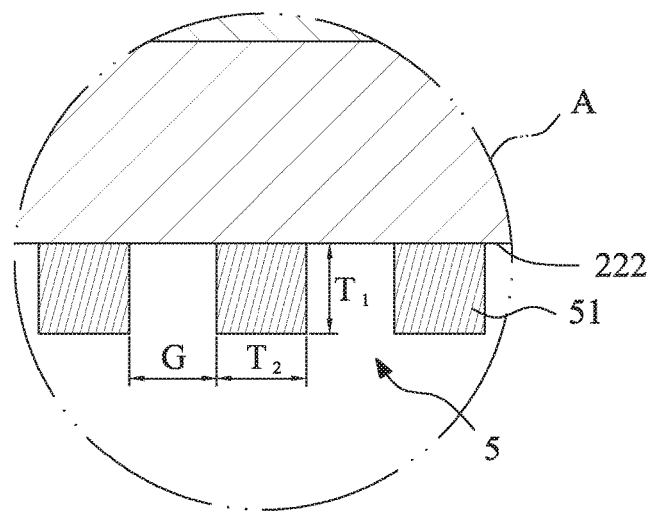
FIG. 7 illustrates an enlarged view of a section E shown in FIG. 6 according to an embodiment of the present disclosure.

FIG. 7 illustrates an enlarged view of a section E shown in FIG. 6 according to an embodiment of the present disclosure. As can be seen for this embodiment, a cross section of each of the protrusions 51 is square; thus, a thickness $T_1$ and a width $T_2$ of a protrusion 51 are approximately equal. A gap G between two protrusions 51 is approximately equal to the width $T_2$. In other embodiments, the thickness $T_1$ and the width $T_2$ are different (e.g., the cross section of the protrusion 51 is a rectangle or other shape), and the gap G may be different from the width $T_2$ of the protrusion 51.

Figure 8:
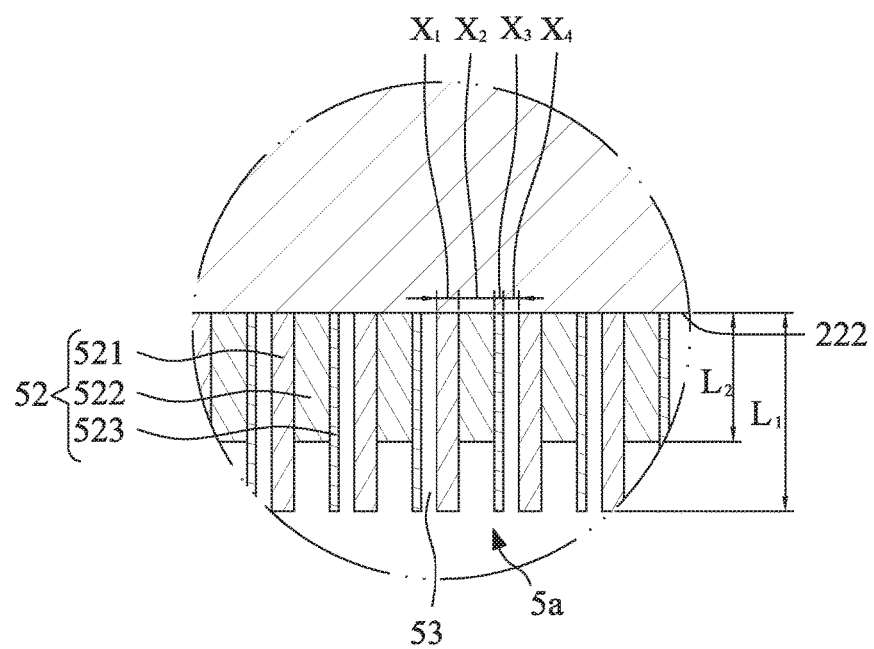
FIG. 8 illustrates an enlarged view of protrusions of a grating structure according to an embodiment of the present disclosure.

FIG. 8 illustrates an enlarged view of a protrusion 52 of a grating structure 5a according to an embodiment of the present disclosure. The grating structure 5a of this embodiment is similar to the grating structure 5 as shown in FIGS. 6 and 7, with a difference being that the protrusion 52 has an approximately inverted U shape in the orientation shown. In the embodiment illustrated in FIG. 8, the protrusion 52 includes a first portion 521, a second portion 522 and a third portion 523. The first portion 521, the second portion 522 and the third portion 523 may be, or may include, same or similar materials; or, one or more of the first portion 521, the second portion 522 or the third portion 523 may include materials different than others of the first portion 521, the second portion 522 or the third portion 523. A length $L_1$ is approximately a length of the first portion 521 and approximately a length of the third portion 523 (the first portion 521 and the third portion 523 are of approximately equal length). A length $L_2$ of the second portion 522 is less than the length $L_1$, to form the U shape. In an embodiment, $L_1$ is approximately 0.86067 μm, and $L_2$ is approximately 0.66024 μm. A width of the first portion 521 is $X_1$, a width of the second portion 522 is $X_2$, a width of the third portion 523 is $X_3$, and a width of a gap 53 between two protrusions 52 is $X_4$. In one or more embodiments, $X_2 > X_1 > X_4 > X_3$. In an embodiment, $X_1$ is approximately 0.015 μm, $X_2$ is approximately 0.028 μm, $X_3$ is approximately 0.007 μm and $X_4$ is approximately 0.012 μm.

Figure 9:
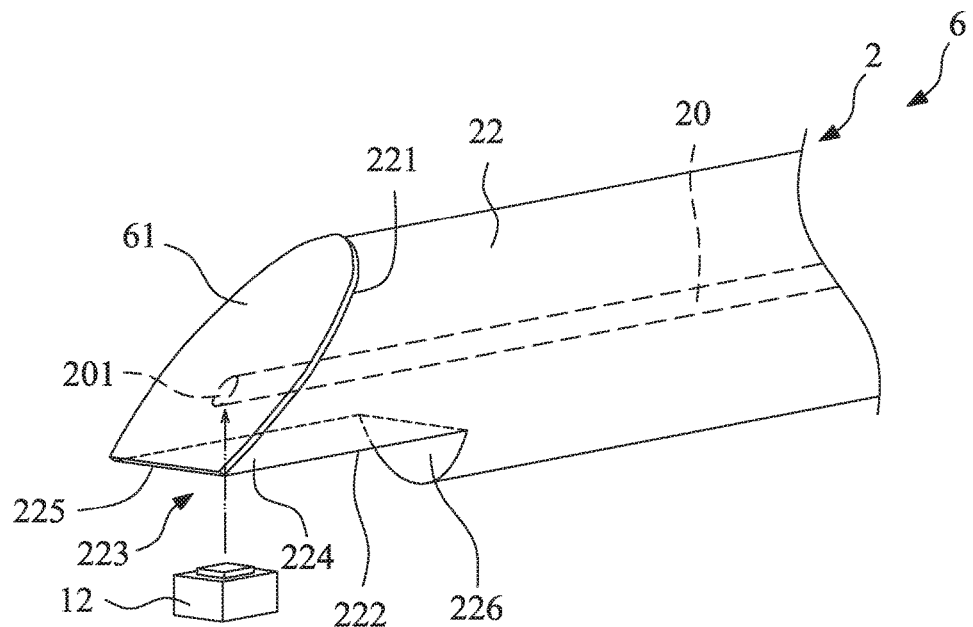
FIG. 9 illustrates a perspective view of an optical communication apparatus according to an embodiment of the present disclosure.

FIG. 9 illustrates a perspective view of an optical communication apparatus 6 according to an embodiment of the present disclosure. The optical communication apparatus 6 is similar to the optical communication apparatus 1 as shown in FIGS. 1 and 2, with a difference being that the optical communication apparatus 6 further includes a reflection film 61 on the light reflection surface 221, for reflecting the light beam emitted from the light source 12 to the core portion 20. In one or more embodiments, the reflection film 61 is formed by coating, and the reflection film 61 includes gold (Au), another suitable metal, or an alloy thereof.

Figure 10:
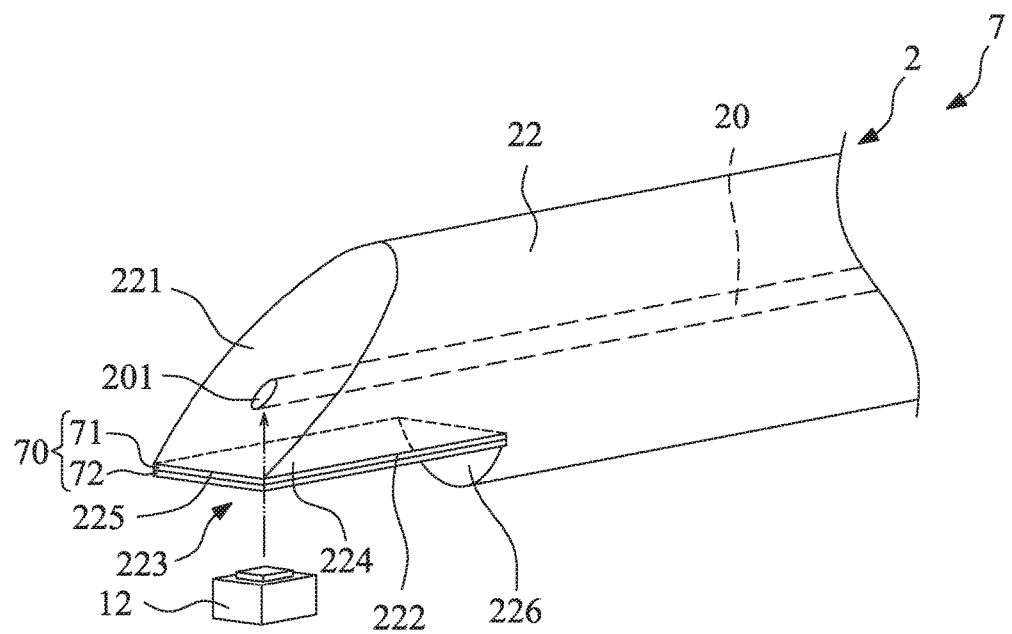
FIG. 10 illustrates a perspective view of an optical communication apparatus according to an embodiment of the present disclosure.

FIG. 10 illustrates a perspective view of an optical communication apparatus 7 according to an embodiment of the present disclosure. The optical communication apparatus 7 is similar to the optical communication apparatus 1 as shown in FIGS. 1 and 2, with a difference being that the optical communication apparatus 7 further includes an anti-reflection film 70 on the light incident surface 222. The anti-reflection film 70 is used to reduce the portion of the light beam emitted from the light source 12 that is reflected by the light incident surface 222, to increase a portion of the light beam emitted from the light source 12 that enters the cladding portion 22 through the light incident surface 222.

In one or more embodiments, the anti-reflection film 70 includes multiple layers. In the embodiment illustrated in FIG. 10, the anti-reflection film 70 includes two layers, a first layer 71 and a second layer 72, where the first layer 71 is disposed on the light incident surface 222, and the second layer 72 is disposed on the first layer 71. A refractive index of the first layer 71 is less than a refractive index of the second layer 72. In one or more embodiments, the first layer 71 is, or includes, $SiO_2$, and the second layer 72 is, or includes, $TiO_2$. In one or more embodiments, the anti-reflection film 70 may include more than two layers, and additional layers are disposed over the second layer 72. In one or more embodiments, the anti-reflection film 70 includes two additional layers, a third layer disposed over the second layer 72 and a fourth layer disposed over the third layer. In such embodiments, a refractive index of the third layer may be less than the refractive index of the second layer 72, and may be approximately equal to the refractive index of the first layer 71, and a refractive index of the fourth layer may be greater than the refractive index of the third layer, and may be approximately equal to the refractive index of the second layer 72.

Figure 11:
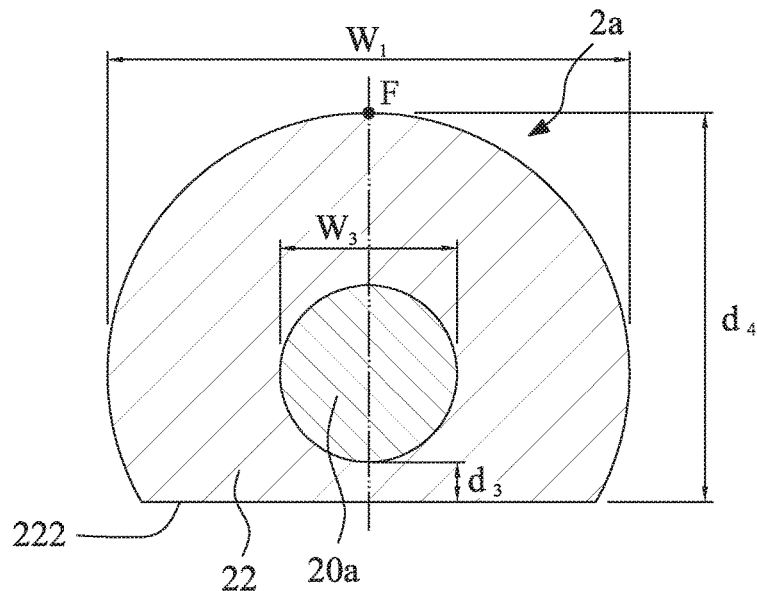
FIG. 11 illustrates a cross sectional view of an optical fiber structure according to an embodiment of the present disclosure.

FIG. 11 illustrates a cross sectional view of an optical fiber structure 2a according to an embodiment of the present disclosure. The optical fiber structure 2a of this embodiment is similar to the optical fiber structure 2 as shown in FIGS. 1-3, with a difference being that a diameter of the core portion 20a in FIG. 11 is increased. For example, the optical fiber structure 2a is a multi-mode fiber, the diameter $W_1$ of the cladding portion 22 is about 125 μm, a diameter $W_3$ of the core portion 20a is about 50 μm, a minimum distance $d_3$ between the core portion 20a and the light incident surface 222 is less than about 18.5 μm and greater than about 0.8 μm, and a distance $d_4$ between the light incident surface 222 and a point F on a perimeter of the cladding portion 22 at a point opposite the light incident surface is less than about 106 μm and greater than about 88.3 μm.

Figure 12:
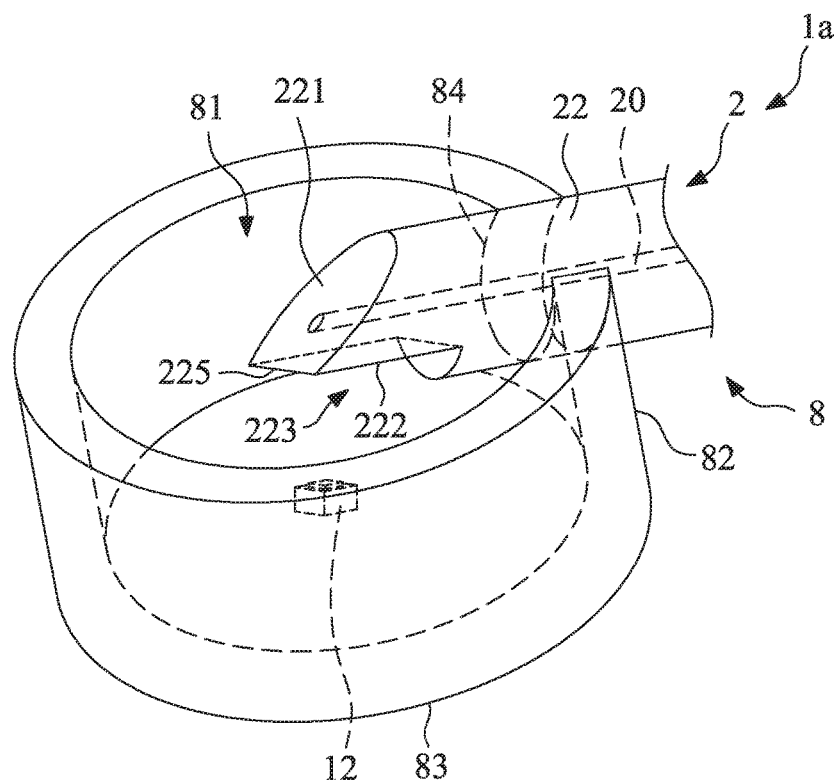
FIG. 12 illustrates a perspective view of an optical communication apparatus according to an embodiment of the present disclosure.

FIG. 12 illustrates a perspective view of an optical communication apparatus 1a according to an embodiment of the present disclosure. The optical communication apparatus 1a is similar to the optical communication apparatus 1 as shown in FIGS. 1-3, with a difference being that the optical communication apparatus 1a further includes a substrate 8 for receiving the optical fiber structure 2 and the light source 12. The substrate 8 includes a recess portion 81, a side wall 82, a bottom wall 83 and a groove 84. The recess portion 81 is defined by the side wall 82 and the bottom wall 83. The groove 84 is located on a top side of the side wall 82. The light source 12 is disposed in the recess portion 81 on an upper surface of the bottom wall 83, and the optical fiber structure 2 is disposed and fixed in the groove 84 on the side wall 82 transversely so that the light incident surface 222 faces the light source 12.

Figure 13:
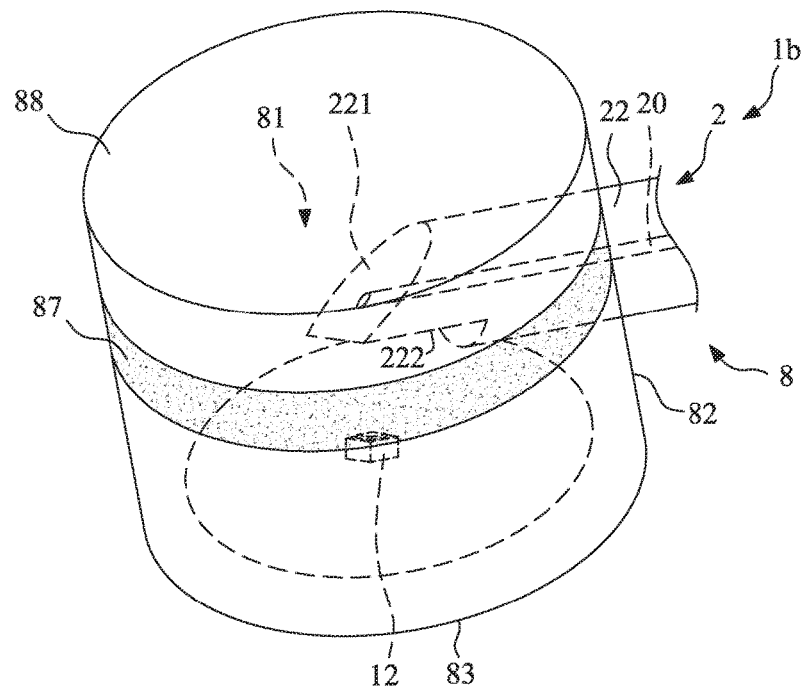
FIG. 13 illustrates a perspective view of an optical communication apparatus according to an embodiment of the present disclosure.

FIG. 13 illustrates a perspective view of an optical communication apparatus 1b according to an embodiment of the present disclosure. The optical communication apparatus 1b is similar to the optical communication apparatus 1a as shown in FIG. 12, with a difference being that the optical communication apparatus 1b further includes an adhesive 87 and a top cover 88. The adhesive 87 is used to fill the recess portion 81 and cover the portion of the optical fiber structure 2 above the light source 12. The top cover 88 contacts and is pressed onto the adhesive 87 to fix the optical fiber structure 2 in position.

Figure 14:
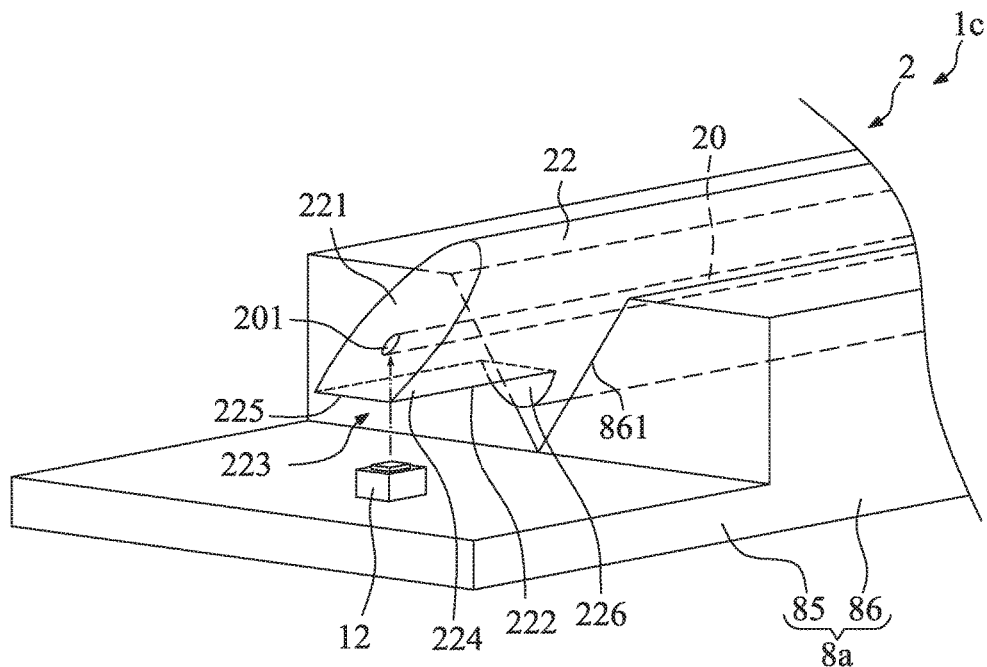
FIG. 14 illustrates a perspective view of an optical communication apparatus according to an embodiment of the present disclosure.

FIG. 14 illustrates a perspective view of an optical communication apparatus 1c according to an embodiment of the present disclosure. The optical communication apparatus 1c is similar to the optical communication apparatus 1 as shown in FIG. 1-3, with a difference being that the optical communication apparatus 1c further includes a substrate 8a for receiving the optical fiber structure 2 and the light source 12. The substrate 8a includes a first portion 85 and a second portion 86. The first portion 85 extends horizontally from the second portion 86 at a bottom of the second portion 86. The second portion 86 defines a groove 861. The light source 12 is disposed on the first portion 85, and the optical fiber structure 2 is disposed and fixed in the groove 861 so that the light incident surface 222 faces the light source 12.

Figure 15:
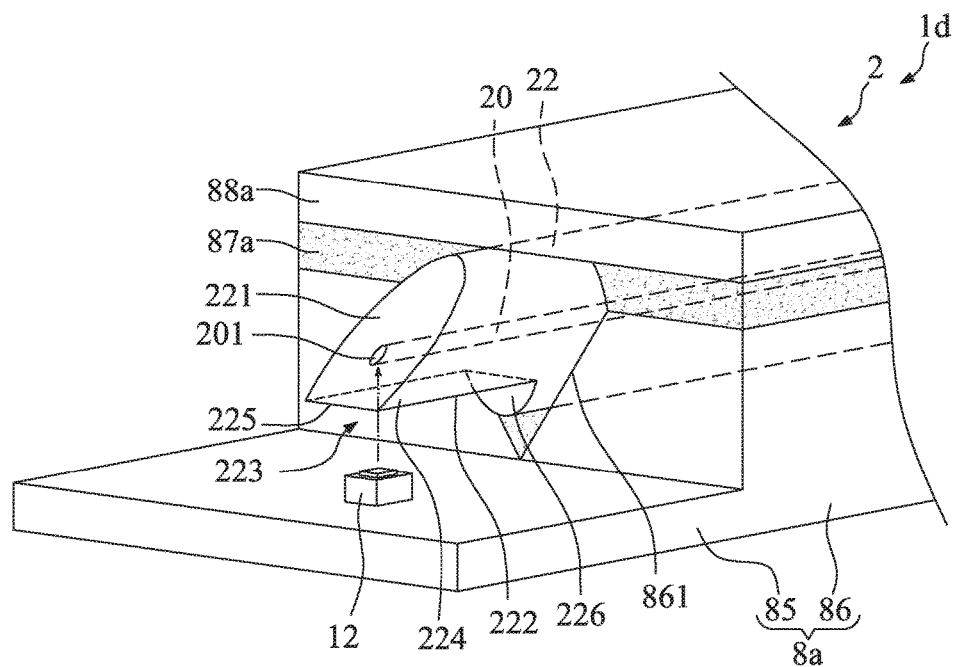
FIG. 15 illustrates a perspective view of an optical communication apparatus according to an embodiment of the present disclosure.

FIG. 15 illustrates a perspective view of an optical communication apparatus 1d according to an embodiment of the present disclosure. The optical communication apparatus 1d is similar to the optical communication apparatus 1c as shown in FIG. 14, with a difference being that the optical communication apparatus 1d further includes an adhesive 87a and a top cover 88a. The adhesive 87a is used to fill the groove 861 and cover the portion of the optical fiber structure 2 in and above the groove 861. The top cover 88a contacts and is pressed onto the adhesive 87a to fix the optical fiber structure 2 in position.

FIGS. 16-19 illustrate a manufacturing process according to an embodiment of the present disclosure.

Figure 16:
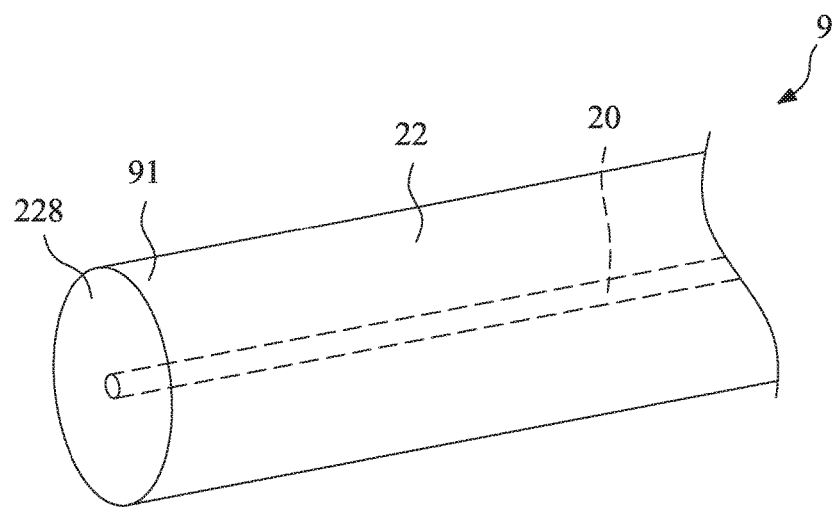
FIG. 16, FIG. 17, FIG. 18 and FIG. 19 illustrate a manufacturing process according to an embodiment of the present disclosure.

Referring to FIG. 16, a fiber 9 is provided. The fiber 9 includes a core portion 20, a cladding portion 22 an end portion 91. The cladding portion 22 encloses/surrounds the core portion 20, and a refractive index of the cladding portion 22 is lower than a refractive index of the core portion 20. The core portion 20 and the cladding portion 22 may include a same or similar materials. For example, the core portion 20 and the cladding portion 22 include silica (e.g., $SiO_2$). The cladding portion 22 has an end surface 228 at the end portion 91 of the fiber 9. The end surface 228 is perpendicular to a line along which the core portion 20 lies. In this embodiment, the fiber 9 is a single mode fiber, a diameter of the cladding portion 22 is approximately 125 μm, and a diameter of the core portion 20 is approximately 8 μm.

Figure 17:
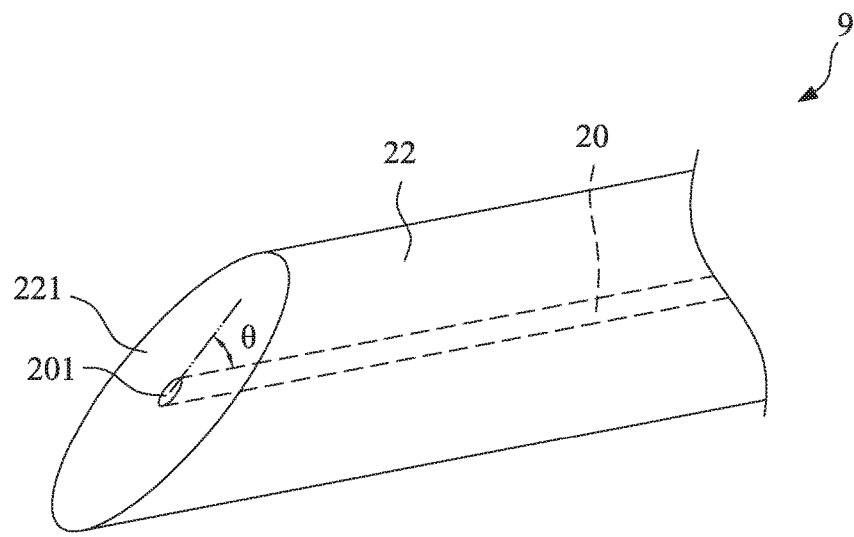

Referring to FIG. 17, a portion of the end portion 91 of the fiber 9 is removed (e.g., by grinding or etching), to form a light reflection surface 221 inclined at an angle θ with respect to the core portion 20. For example, the angle θ is about 30 degrees to about 60 degrees, such as about 35 degrees to about 55 degrees, about 40 degrees to about 50 degrees, or about 45 degrees. One end 201 of the core portion 20 is exposed from the light reflection surface 221.

Figure 18:
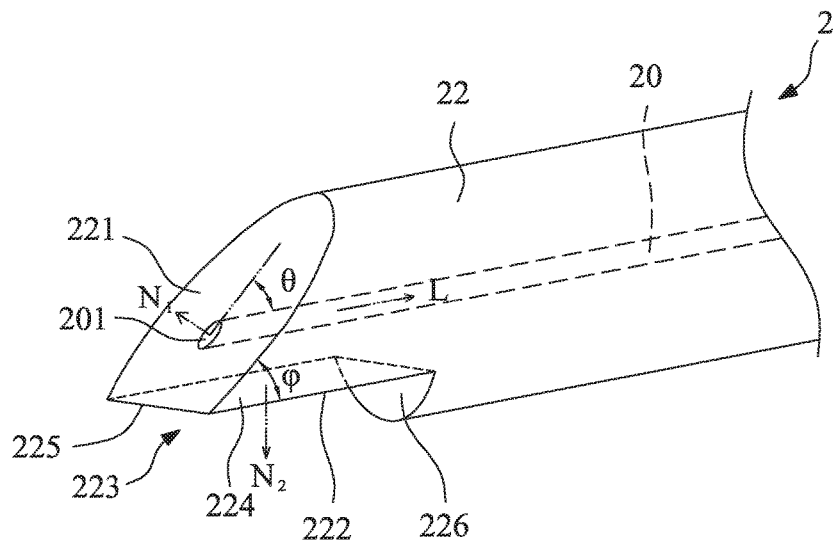

Referring to FIG. 18, a portion of a periphery of the fiber 9 is removed (e.g., by grinding or etching), to form a light incident surface 222. In this embodiment, a portion of the light reflection surface 221 is also removed; thus, the light reflection surface 221 and the light incident surface 222 intersect to form a wedge portion 224 and an intersecting edge 225, and the optical fiber structure 2 as illustrated and described with respect to FIGS. 1-3 is obtained. As shown in FIG. 18, the cladding portion 22 has a notch 223 on a bottom portion thereof, and the light incident surface 222 is a top surface of the notch 223. In other embodiments, the portion of the light reflection surface 221 is not removed (e.g., a notch 223' is made narrower than the notch 223, or is shifted away from the light incident surface 222); thus, the light reflection surface 221 does not intersect with the light incident surface 222, and the optical fiber structure 3 as illustrated and described with respect to FIG. 4 is obtained.

In one or more embodiments, after the stage of FIG. 18, a grating structure may be formed on the light incident surface 222. For example, a grating structure with periodic protrusions may be formed, such as periodic columnar structures with approximately square cross-section as shown in FIGS. 5 and 6, or such as periodic U-shaped structures with three differently-sized portions as shown in FIG. 8. The grating structure may be formed, for example, by coating a material on the light incident surface 222, by etching the light incident surface 222, or a combination thereof. In one or more embodiments, protrusions (e.g., the protrusions 51 in FIGS. 5 and 6) are formed of $TiO_2$, which has a refractive index similar to a refractive index of the cladding portion 22 (e.g., $SiO_2$), for constructive interference when a light beam passes through the grating structure into the cladding portion 22. It is noted that, when protrusions are formed by etching the light incident surface 222, the protrusions and the cladding portion 22 are formed of the same material. In one or more embodiments, protrusions are formed by etching the light incident surface 222, and then coating a material onto the light incident surface 222 along the sides of the protrusions.

In one or more embodiments, after the stage of FIG. 18, a reflection film of one or more layers is formed on the light reflection surface 221 (e.g., the reflection film 61, to obtain the optical fiber structure 6 of FIG. 9). The reflection film may be formed by coating. In an embodiment, the reflection film includes Au.

In one or more embodiments, after the stage of FIG. 18, an anti-reflection film of one or more layers is formed on the light incident surface 222 (e.g., the reflection film 70, to obtain the optical fiber structure 7 of FIG. 10). In an embodiment, the anti-reflection film includes a layer of $SiO_2$ formed over the light incident surface 222 and a layer of $TiO_2$ formed over the layer of $SiO_2$. In an embodiment, one or more additional layers are formed over the layer of $TiO_2$. In an embodiment, the reflection film includes four layers (a first layer over the light incident surface 222, a second layer over the first layer, a third layer over the second layer, and a fourth layer over the third layer), where a refractive index of the third layer is less than a refractive index of the second layer and may be approximately equal to a refractive index of the first layer, and a refractive index of the fourth layer is greater than the refractive index of the third layer and may be approximately equal to the refractive index of the second layer.

Figure 19:
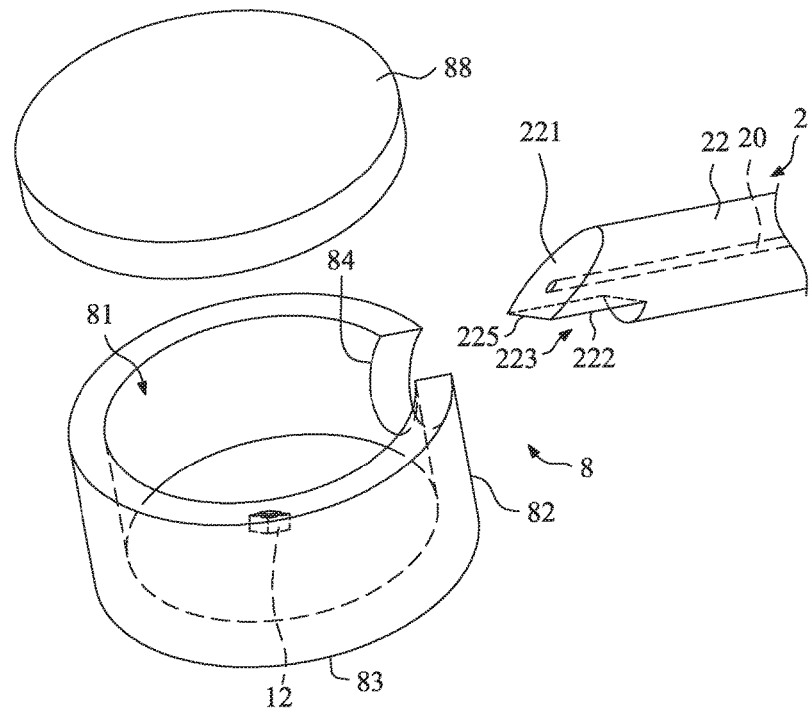

Referring to FIG. 19, a substrate 8 and a light source 12 are provided. The substrate 8 includes a recess portion 81, a side wall 82, a bottom wall 83 and a groove 84. The recess portion 81 is defined by the side wall 82 and the bottom wall 83, and the groove 84 is located on a top side of the side wall 82. A light source 12 is disposed on the bottom wall 83 in the recess portion 81. In one or more embodiments, the light source 12 is a VCSEL light source or an edge-emitting laser light source. The optical fiber structure 2 is disposed in and fixed in the groove 84 on the side wall 82 transversely, so that the light incident surface 222 faces the light source 12. Thus, the optical communication apparatus 1a as shown in FIG. 12 is obtained.

In an embodiment, an adhesive 87 (FIG. 13) and a top cover 88 are further provided. The adhesive 87 is used to fill the recess portion 81 and cover the portion of the optical fiber structure 2 above the light source 12. Then, the top cover 88 contacts and is pressed onto the adhesive 87 to fix the optical fiber structure 2 in position. Thus, the optical communication apparatus 1b as shown in FIG. 13 is obtained.

Figure 20:
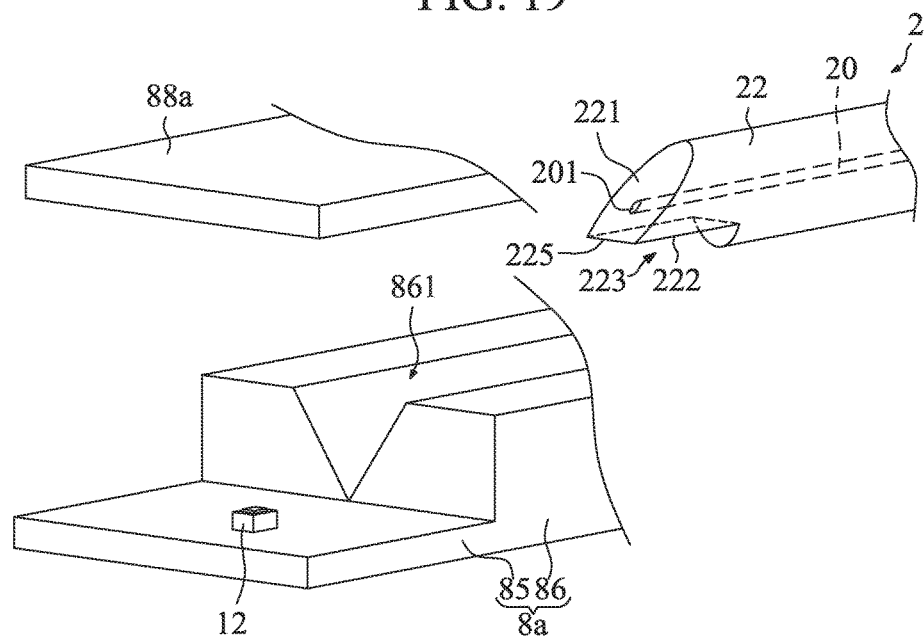
FIG. 20 illustrates a manufacturing process according to an embodiment of the present disclosure.

FIG. 20 illustrates a manufacturing process according to an embodiment of the present disclosure. The initial stages of this embodiment are as shown in FIGS. 16 to 18, and the stage of FIG. 20 is subsequent to the stage of FIG. 18. As shown in FIG. 20, a substrate 8a is provided. The substrate 8a includes a first portion 85 and a second portion 86. The first portion 85 extends horizontally from a bottom of the second portion 86. The second portion 86 defines a groove 861. A light source 12 is disposed on the first portion 85. In one or more embodiments, the light source 12 is a VCSEL light source or an edge-emitting laser light source. The optical fiber structure 2 is disposed in and fixed in the groove 861 so that the light incident surface 222 faces the light source 12. Thus, the optical communication apparatus 1b as shown in FIG. 13 is obtained.

In an embodiment, an adhesive 87a (FIG. 15) and a top cover 88a are further provided. The adhesive 87a is used to fill the groove 861 and cover the portion of the optical fiber structure 2 in and above the groove 861. Then, the top cover 88a contacts and is pressed onto the adhesive 87a to fix the optical fiber structure 2 in position. Thus, the optical communication apparatus 1d as shown in FIG. 15 is obtained.

As can be seen by the example embodiments above, an optical communication apparatus according to embodiments of the present disclosure may omit a rotatable micromirror; thus, manufacturing cost is reduced.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For another example, two numerical values can be deemed to be substantially the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

The term "substantially perpendicular" referring to two components can refer to a range of variation of less than or equal to ±10° of 90° between the two components, such as less than or equal to ±5°, less than or equal to ±3°, less than or equal to ±2°, or less than or equal to ±1°. The term "substantially parallel" referring to two components (each component laying along one of a line or a plane) can refer to an angular displacement between the two components being less than or equal to 10°, such as less than or equal to 5°, less than or equal to 3°, less than or equal to 2°, or less than or equal to 1°.

The term "substantially flat" can refer to a surface where a difference between a highest point and a lowest point of the surface is no greater than 3 µm, no greater than 2 µm, no greater than 1 µm, no greater than 0.5 µm, or no greater than 0.1 µm.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. An optical fiber structure comprising:
   a core portion;
   a cladding portion enclosing the core portion, wherein the cladding portion includes a light reflection surface and a light incident surface, the light reflection surface is inclined at an angle of about 30 degrees to about 60 degrees with respect to the core portion, and the light incident surface is substantially flat and is substantially parallel with the core portion; and
   a grating structure disposed on the light incident surface, wherein the grating structure includes a plurality of periodic protrusions, and the periodic protrusions and the cladding portion have a common refractive index for constructive light interference;
   wherein a minimum distance between the core portion and the light incident surface is less than about 18.5 µm and greater than about 0.8 µm.

2. The optical fiber structure according to claim 1, wherein a normal vector of the light reflection surface, a normal vector of the light incident surface and an extending direction of the core portion are in approximately a same plane.

3. The optical fiber structure according to claim 1, wherein the light reflection surface and the light incident surface intersect to form a wedge portion.

4. The optical fiber structure according to claim 1, wherein an angle between the light reflection surface and the light incident surface is about 45 degrees.

5. The optical fiber structure according to claim 1, wherein each protrusion is in a substantially U shape, and there is a gap is between each two adjacent protrusions.

6. The optical fiber structure according to claim 1, further comprising an anti-reflection film disposed on the light incident surface, wherein the anti-reflection film comprises a first layer and a second layer, the first layer is disposed on the light incident surface, the second layer is disposed on the first layer, and a refractive index of the first layer is less than a refractive index of the second layer.

7. An optical communication apparatus comprising:
   an optical fiber structure comprising:
      a core portion,
      a cladding portion enclosing the core portion, wherein the cladding portion includes a light reflection surface and a substantially flat light incident surface, the light reflection surface is inclined at an angle of about 30 degrees to about 60 degrees with respect to the core portion, and
      a grating structure disposed on the light incident surface, wherein the grating structure includes a plurality of periodic protrusions, and the periodic protrusions and the cladding portion have a common refractive index for constructive light interference; and a light source positioned below the light incident surface and configured to emit a light beam into the optical fiber structure through the light incident surface to the core portion of the optical fiber structure;

wherein a minimum distance between the core portion and the light incident surface is less than about 18.5 μm and greater than about 0.8 μm.

8. The optical communication apparatus according to claim 7, wherein the cladding portion defines a notch having two side surfaces, and the light incident surface of the cladding portion further defines the notch.

9. The optical communication apparatus according to claim 7, further comprising a substrate having a recess portion, wherein the light source is disposed in the recess portion, and the optical fiber structure is disposed on a side wall of the substrate and is positioned so that the light incident surface faces the light source.

10. The optical communication apparatus according to claim 7, further comprising a substrate including a first portion and a second portion, wherein the first portion extends horizontally from the second portion at a bottom of the second portion, the second portion defines a groove, the light source is disposed on the first portion, and the optical fiber structure is disposed and fixed in the groove so that the light incident surface faces the light source.

11. The optical communication apparatus according to claim 7, wherein the light source is a vertical cavity surface emitting laser (VCSEL) light source or an edge-emitting laser light source.

12. The optical communication apparatus according to claim 7, wherein the optical fiber structure further comprises an anti-reflection film on the light incident surface.

13. An optical communication apparatus comprising:
an optical fiber structure comprising:
a core portion,
a cladding portion enclosing the core portion, wherein the cladding portion includes a light reflection surface and a light incident surface, the light reflection surface is inclined at an angle of about 30 degrees to about 60 degrees with respect to the light incident surface, and the light reflection surface and the light incident surface intersect to form an intersecting edge, and
a grating structure disposed on the light incident surface, wherein the grating structure includes a plurality of periodic protrusions, and the periodic protrusions and the cladding portion have a common refractive index for constructive light interference;
wherein a minimum distance between the core portion and the light incident surface is less than about 18.5 μm and greater than about 0.8 μm.

14. The optical communication apparatus according to claim 13, wherein the light incident surface is substantially flat.

15. The optical communication apparatus according to claim 13, wherein the cladding portion includes a side surface, and the side surface and the light incident surface define a notch in the cladding portion.

16. The optical communication apparatus according to claim 13, wherein an end of the core portion is exposed from the light reflection surface.

17. The optical communication apparatus according to claim 13, further comprising a light source positioned below the light incident surface and configured to emit a light beam into the optical fiber structure through the light incident surface to the core portion of the optical fiber structure.

18. The optical communication apparatus according to claim 17, further comprising a substrate having a recess portion, wherein the light source is disposed in the recess portion, and the optical fiber structure is disposed on a side wall of the substrate and is positioned so that the light incident surface faces the light source.

* * * * *